(12) United States Patent
Dabbs

(10) Patent No.: US 8,849,535 B2
(45) Date of Patent: Sep. 30, 2014

(54) ELECTRO-HYDRAULIC BRAKE VALVE PERFORMANCE MONITORING

(75) Inventor: Harold Dabbs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 13/460,235

(22) Filed: Apr. 30, 2012

(65) Prior Publication Data

US 2013/0289842 A1    Oct. 31, 2013

(51) Int. Cl.
*B60T 8/17*    (2006.01)

(52) U.S. Cl.
USPC .......................................................... 701/70

(58) Field of Classification Search
CPC ....................................................... B60T 17/22
USPC .......................................................... 701/70
See application file for complete search history.

(56) References Cited

U.S. PATENT DOCUMENTS

| | | |
|---|---|---|
| 4,951,767 A | 8/1990 | Keagbine |
| 5,042,323 A * | 8/1991 | Murano et al. ................. 477/45 |
| 6,019,126 A | 2/2000 | Kelada |
| 7,540,572 B2 | 6/2009 | Nakamura |
| 8,121,770 B2 * | 2/2012 | Zheng ............................. 701/78 |
| 2002/0133283 A1 * | 9/2002 | Bodie et al. ..................... 701/70 |
| 2004/0012258 A1 | 1/2004 | Hosoi et al. |
| 2010/0228451 A1 * | 9/2010 | Hosoya et al. .................. 701/51 |
| 2011/0256919 A1 * | 10/2011 | Aida ............................... 463/20 |

* cited by examiner

*Primary Examiner* — Fadey Jabr
*Assistant Examiner* — Yazan A Soofi
(74) *Attorney, Agent, or Firm* — Miller, Matthias & Hull

(57) ABSTRACT

In a machine having an electro-hydraulic brake valve, issues in providing a desired brake pressure may be determined by comparing an actual brake output pressure of the brake valve to an acceptable brake pressure range for an output brake command current provided to the brake valve to generate the desired brake pressure. Where the actual brake output pressure is outside the acceptable brake pressure range, the brake pressure difference and time-rate-of-change of the brake pressure may be used to determine a weighted brake pressure difference that is accumulated over a series of sample cycles and compared to an integration limit to determine whether the operator should be warned of the brake pressure difference. The integration limit may be based on a factor indicative of the responsiveness of the machine, such as the oil temperature.

24 Claims, 4 Drawing Sheets

ELECTRO-HYDRAULIC BRAKE VALVE PERFORMANCE MONITORING

TECHNICAL FIELD

This invention relates generally to electro-hydraulic brakes for a machine and, more particularly, to a control system for detecting excessive variations in the fluid pressure in electro-hydraulic brakes and for alerting an operator of the machine of the occurrence of the fluid pressure variations and taking other corrective actions.

BACKGROUND

Electro-hydraulic brake valves may be used in earth-moving equipment, such as track-type tractors and other types of earth-moving machines, to apply and release braking devices. Electronic controllers may control the brake valves by transmitting brake command currents to the brake valve in response to detecting actuation or release of a braking control device by an operator of the earth-moving machine. In other implementations wherein the machine may be autonomously operated using GPS or other navigation technology, the controller may determine when to actuate or release the braking device based on the position, speed and direction of motion of the machine, and automatically transmit the brake command currents. The brake valve responds to the brake command currents by changing the pressure within the braking device to tighten or loosen the braking device as commanded.

When operating properly, the brake command currents will cause the brake valve to create pressure within an acceptable range of pressures to effectuate the commanded braking. However, the brake valve and braking device may not always respond as expected. The pressure created in response to the braking signal may lie outside the acceptable pressure range. If the pressure is too great, the machine may stop suddenly, or the tubes and seals carrying the hydraulic fluid may rupture. If the pressure is too low, the machine may not stop at all or at least as quickly as desired. The improper response by the brake valve and braking device may be a sign of degradation in the system or a potential failure mode that causes loss of brake performance.

Control systems and failure detection apparatus for brake systems are known in the art. For example, U.S. Pat. No. 7,540,572, entitled "Failure Detection Apparatus," teaches a failure detecting apparatus for detecting a failure of a solenoid-operated control valve having a coil, a valve chamber, and a movable member which is movable, while changing a volume of the valve chamber, by an electromagnetic drive force produced upon supplying of an electric current to the coil so that the solenoid-operated control valve is selectively placed in one of an open state thereof and a closed state thereof. The failure detecting apparatus includes a pressure-change detecting device which detects a change of a pressure on at least one of a high-pressure side and a low-pressure side of the solenoid-operated control valve, and a failure detecting portion which detects that the solenoid-operated control valve has failed when a change of the pressure detected by the pressure-change detecting device upon controlling of the electric current supplied to the coil is smaller than a change of the pressure that results from a change of the volume of the valve chamber caused by a movement of the movable member. The control disclosed in the publication relates only to failures where the actual pressure produced by the control valve is less than expected, but actual pressures exceeding the expected pressure may also be undesirable.

In another example, U.S. Pat. Appl. Publ. No. 2004/0012258, entitled "Brake Control Apparatus with Solenoid Valve," teaches, in a brake control apparatus, a range of change in a hydraulic pressure with respect to an amount of current applied by a drive signal from a control circuit of a normally-open (N/O) valve provided in a hydraulic path that extends from a hydraulic pressure generation source to a wheel cylinder is set to be smaller than a range of change in a hydraulic pressure with respect to an amount of current applied to a normally closed (N/C) valve provided in a hydraulic path that extends from the wheel cylinder to a reservoir. Accordingly, it is possible to decrease the hydraulic pressure which is generated when the amount of current is minutely varied in the N/O valve, thereby enhancing controllability of the hydraulic pressure. This enables highly accurate hydraulic control. The teaching of the reference focuses on accurate hydraulic control in the braking system, but does not relate to identifying over-pressure and under-pressure responses in the braking system and executing a strategy for responding to such conditions.

In view of the above, a need exists for an electro-hydraulic brake valve monitoring system for detecting under-pressure and over-pressure situations in braking systems and alerting an operator of the vehicle or taking other corrective actions in response. A further need exists in such a brake valve monitoring system for taking into account and basing the responsiveness of the system on the effects of internal and external factors affecting the speed of reaction of the vehicle to correct issues in the braking system.

SUMMARY OF THE INVENTION

In one aspect of the present disclosure, the invention is directed to a brake valve monitoring system for a machine. The monitoring system may include a brake valve for creating brake pressure in a braking system of the machine, a braking device for providing braking signals indicating a desired brake pressure to be applied by the braking system of the machine, and a control unit operatively connected to the brake valve and the braking device. The control unit may be configured to receive the braking signals from the braking device and to output brake command current to cause the brake valve to created a commanded brake pressure in the braking system, to determine an actual brake output pressure in the braking system, and to determine an acceptable brake pressure range based on the brake command current. The control unit may be configured to determine a weighted brake pressure difference in response to determining that the actual brake output pressure is not within the acceptable brake pressure range, wherein the weighted brake pressure difference is determined based on a difference between the actual brake output pressure and a corresponding end of the acceptable brake pressure range. The control unit may also be configured to add the weighted brake pressure difference to a cumulative integration value for a brake pressure difference, to compare the cumulative integration value to an integration limit for the brake pressure difference, and to execute a response strategy in response to determining that the cumulative integration value is greater than the integration limit.

In another aspect of the present disclosure, the invention is directed to a method for monitoring a brake valve in a machine. The method may include commanding the brake valve to apply a desired brake pressure in a braking system of the machine, determining an actual brake output pressure in the braking system of the machine, determining an acceptable brake pressure range based on the commanded desired brake pressure, and determining whether the actual brake output pressure is within the acceptable brake pressure range. The method may further include determining a weighted brake pressure difference in response to determining that the actual brake output pressure is not within the acceptable brake pressure range, wherein the weighted brake pressure difference is determined based on a difference between the actual brake output pressure and a corresponding end of the acceptable brake pressure range, adding the weighted brake pressure difference to a cumulative integration value for a brake pressure difference, comparing the cumulative integration value to an integration limit for the brake pressure difference, and executing a response strategy in response to determining that the cumulative integration value is greater than the integration limit.

In a further aspect of the present disclosure, the invention is directed to a brake valve monitoring system for a machine. The system may include a brake valve for creating brake pressure in a braking system of the machine, a braking device for providing braking signals indicating a desired brake pressure to be applied by the braking system of the machine, and a control unit operatively connected to the brake valve and the braking device. The control unit may be configured to receive the braking signals from the braking device and to output brake command current to cause the brake valve to created a commanded brake pressure in the braking system, to determine an actual brake output pressure in the braking system, to determine an acceptable brake pressure range based on the brake command current, and to determine whether the actual brake output pressure is within the acceptable brake pressure range. The control unit may also be configured to determine a cumulative integration value for a brake pressure difference in response to determining that the actual brake output pressure is not within the acceptable brake pressure range, wherein the cumulative integration value is determined based on a difference between the actual brake output pressure and a corresponding end of the acceptable brake pressure range, to determine an integration limit for the brake pressure difference based on a value of a parameter indicative of an ability of the machine to produce the desired brake pressure, to compare the cumulative integration value to the integration limit for the brake pressure difference, and to execute a response strategy in response to determining that the cumulative integration value is greater than the integration limit.

In a still further aspect of the present disclosure, the invention is directed to a method for monitoring a brake valve in a machine. The method may include commanding the brake valve to apply a desired brake pressure in a braking system of the machine, determining an actual brake output pressure in the braking system of the machine, determining an acceptable brake pressure range based on the commanded desired brake pressure, and determining whether the actual brake output pressure is within the acceptable brake pressure range. The method may also include determining a cumulative integration value for a brake pressure difference in response to determining that the actual brake output pressure is not within the acceptable brake pressure range, wherein the cumulative integration value is determined based on a difference between the actual brake output pressure and a corresponding end of the acceptable brake pressure range, determining an integration limit for the brake pressure difference, wherein the integration limit is based on a value of a parameter indicative of an ability of the machine to produce the desired brake pressure, comparing the cumulative integration value to the integration limit, and executing a response strategy in response to determining that the cumulative integration value is greater than the integration limit.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated and constitute a part of this specification, illustrate exemplary embodiments of the invention and, together with the description, serve to explain the principles of the invention. In the drawings.

DETAILED DESCRIPTION

Although the following text sets forth a detailed description of numerous different embodiments of the invention, it should be understood that the legal scope of the invention is defined by the words of the claims. The detailed description is to be construed as exemplary only and does not describe every possible embodiment of the invention. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
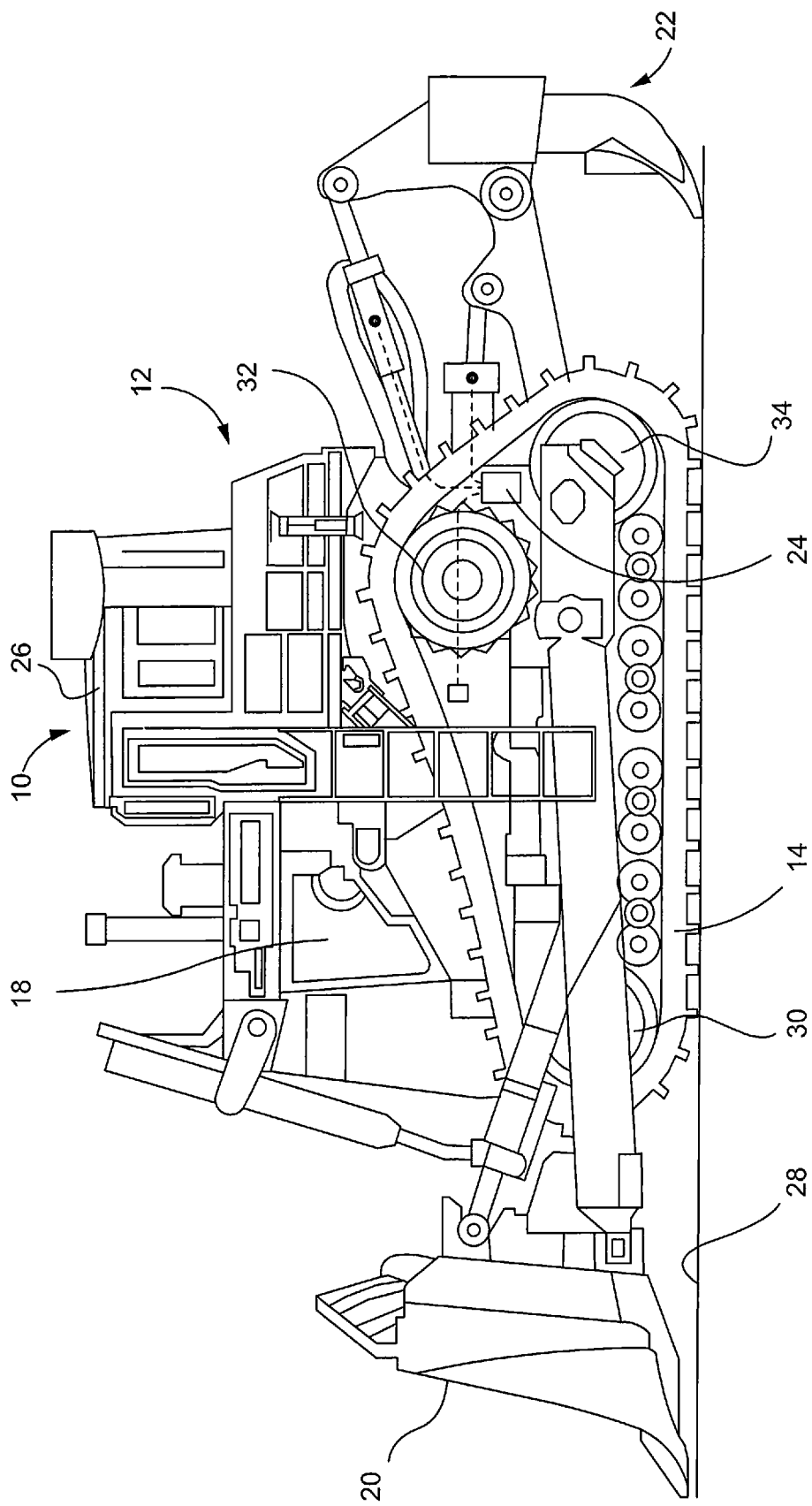
FIG. 1 is a diagrammatic side view of a track-type tractor in which electro-hydraulic brake valve monitoring in accordance with the present disclosure may be implemented.

Referring to FIG. 1, one example of an earth-moving machine in the form of a track-type tractor 10 may include a chassis 12, a pair of movable tracks 14, 16 (not shown) powered by an engine 18, and ground engaging implements in the form of a blade 20 and a ripper 22. The tractor 10 may further include an electronic control unit 24 receiving commands from implement, steering and braking controls (not shown) in an operator station 26 of the tractor 10. As the operator manipulates to the controls, the electronic control unit 24 in response controls the engine 18 to drive the tractor 10 over a surface 28, and operably controls actuators that can change the elevation and orientation of the blade 20 and the ripper 22 to perform the necessary excavation of the work material. In the illustrated embodiment, each track 14, 16 may be supported on the undercarriage by a series of pulleys, including a front idler pulley 30, an upper idler pulley 32, and a drive pulley 34. The drive pulley 34 may be operatively connected to the engine 18 by a transmission (not shown) to received power to drive the tracks 14, 16 and propel the tractor 10. Depending on the design requirements of the tractor 10, one or more braking devices (not shown) may be installed in the tractor 10 in locations to engage one or more of the pulleys 30-34, drive axles (not shown), or both, to further control the propulsion and stopping of the tractor 10. The track-type tractor 10 is used herein for purpose of illustration, but the electro-hydraulic brake valve monitoring in accordance with the present disclosure may be implemented in any other type of vehicle where electro-hydraulic brake valves may be used for braking. Consequently, "tractor," "machine," "vehicle" or other similar terms may be used to generically refer to equipment in which electro-hydraulic brake valves may be present and controlled.

Figure 2:
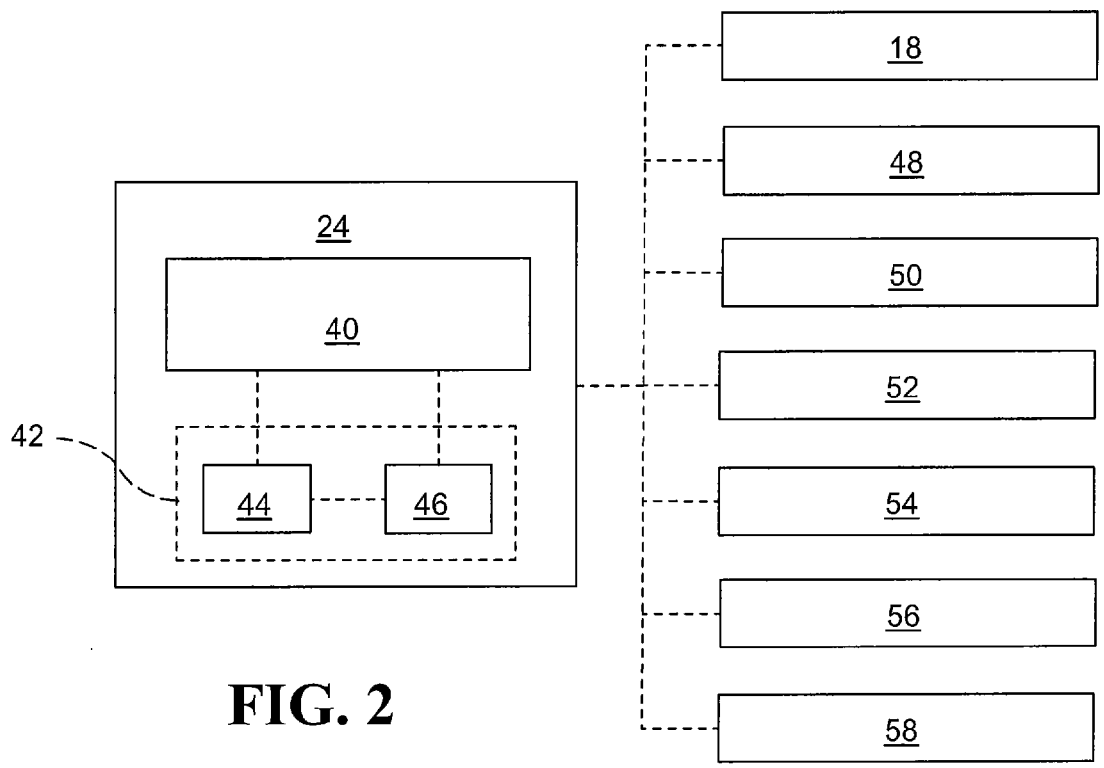
FIG. 2 is a schematic view of electrical components of the track-type tractor of FIG. 1.

Referring now to FIG. 2, the control unit 24 may include a microprocessor 40 for executing a specified program, which controls and monitors various functions associated with the machine 10. The microprocessor 40 includes a memory 42, such as ROM (read only memory) 44, for storing a program, and a RAM (random access memory) 46 which serves as a working memory area for use in executing the program stored in the memory 42. Although the microprocessor 40 is shown, it is also possible and contemplated to use other electronic components such as a microcontroller, an ASIC (application specific integrated circuit) chip, or any other integrated circuit device. The control unit 24 electrically connects to the engine 18, a steering device 48, a direction selector 50, a braking device 52, one or more electro-hydraulic brake valves 54, one or more corresponding brake output pressure sensors 56, and an oil temperature sensor 58. The steering device 48 may be a wheel, joystick, push/pull bar, pedals, or the like in the operator station 26. The direction selector 50 may be a Forward-Neutral-Reverse ("FNR") device, or the like, and provides desired directional information to the control unit 24. The braking device 52 may be a foot pedal, a hand lever or other device providing a braking signal to the controller 24.

Figure 3:
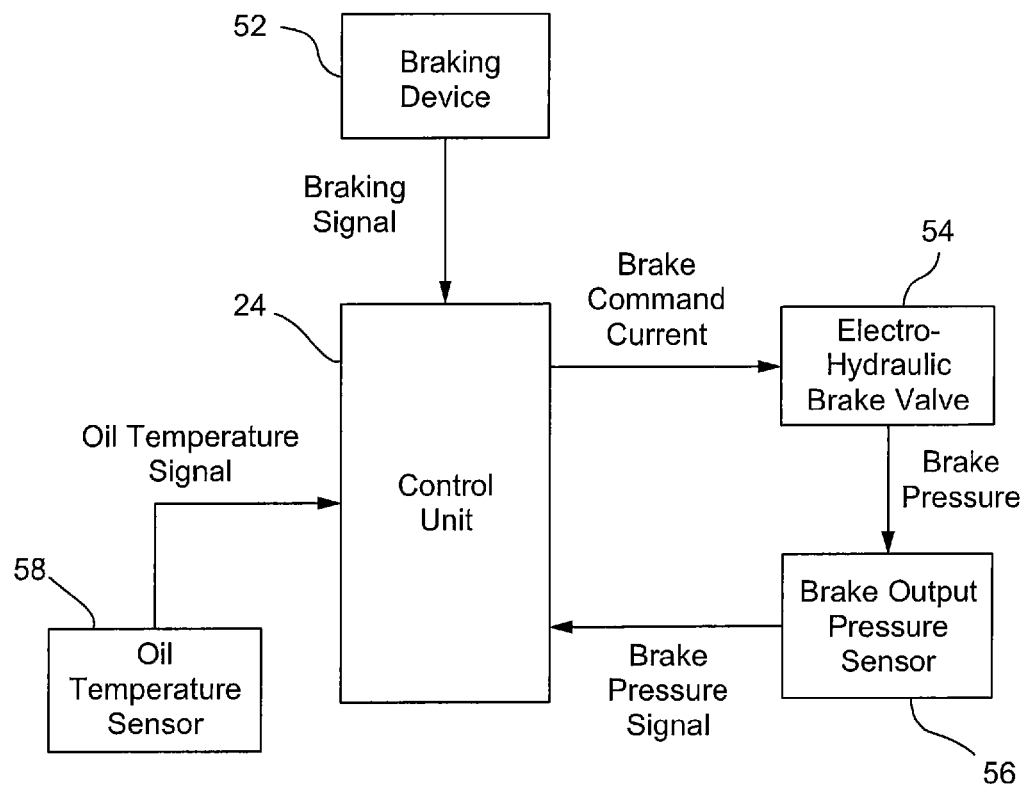
FIG. 3 is a system level diagram illustrating a flow of control signals and sensor inputs for an electro-hydraulic brake valve monitoring system in accordance with the present disclosure of the track-type tractor of FIG. 1 as shown in FIG. 2.

In operation, the braking system regulates the movement of the traction devices 14, 16 and, correspondingly, the tractor 10. FIG. 3 is a system level diagram illustrating the flow of control signals and sensor inputs for an electro-hydraulic brake valve monitoring and control system. The braking control device 52 provides a braking signal to the control unit 24 indicative of an operator's desire to increase or decrease the braking force applied to the propulsion element(s) of the tractor 10 to retard or stop the movement of the tractor 10. In an autonomous machine, the control unit 24 may generate braking signals based on the GPS or other navigation system in addition to, or as an alternative to, the braking signals provided by the braking control device 52. In response to the received or calculated braking signals, the control unit 24 outputs braking command currents commanding the electro-hydraulic braking valve 54 to increase or decrease the hydraulic braking pressure in the brake system based on the value of the braking signal. The electro-hydraulic brake valve 54 either increases or decreases a brake output pressure to adjust the braking force when the operator commands braking.

Even though a single electro-hydraulic brake valve 54 is illustrated, those skilled in the art will understand that the tractor 10 may include one or more electro-hydraulic brake valves 54, with the brake valve monitoring and control strategy discussed herein being applied to each brake valve 54. For example, depending on the machine, some tractors 10 may have a single brake valve 54 as a main pressure source for the entire braking system, two brake valves 54, one each for the front and rear axles, or one brake valve 54 at each of the front idler pulleys 30 and drive pulleys 34 controlling corresponding braking devices. Where multiple brake valves 54 are implemented, the monitoring and control system described herein may be implemented to control each brake valve 54 in a similar manner.

The brake output pressure sensor 56 may sense the brake output pressure created by the electro-hydraulic brake valve 54, and transmit brake output pressure signals to the control unit 24. The brake output pressure signals may be interpreted by the control unit 24 to determine the actual brake output pressure $P_{act}$ created by the electro-hydraulic brake valve 54 and, consequently, the actual braking pressure of the tractor 10 for comparison to the braking pressure commanded by the braking control device 52 and output by the electro-hydraulic brake valve 54. If the actual braking output pressure is equal to the commanded braking pressure, the tractor 10 is moving at the desired speed or stopped as commanded. However, if the actual braking pressure is not equal to the commanded braking pressure, then undesired movement or absence of movement is occurring and the tractor 10 is not moving at the speed desired by the operator or commanded by the control unit 24.

Figure 4:
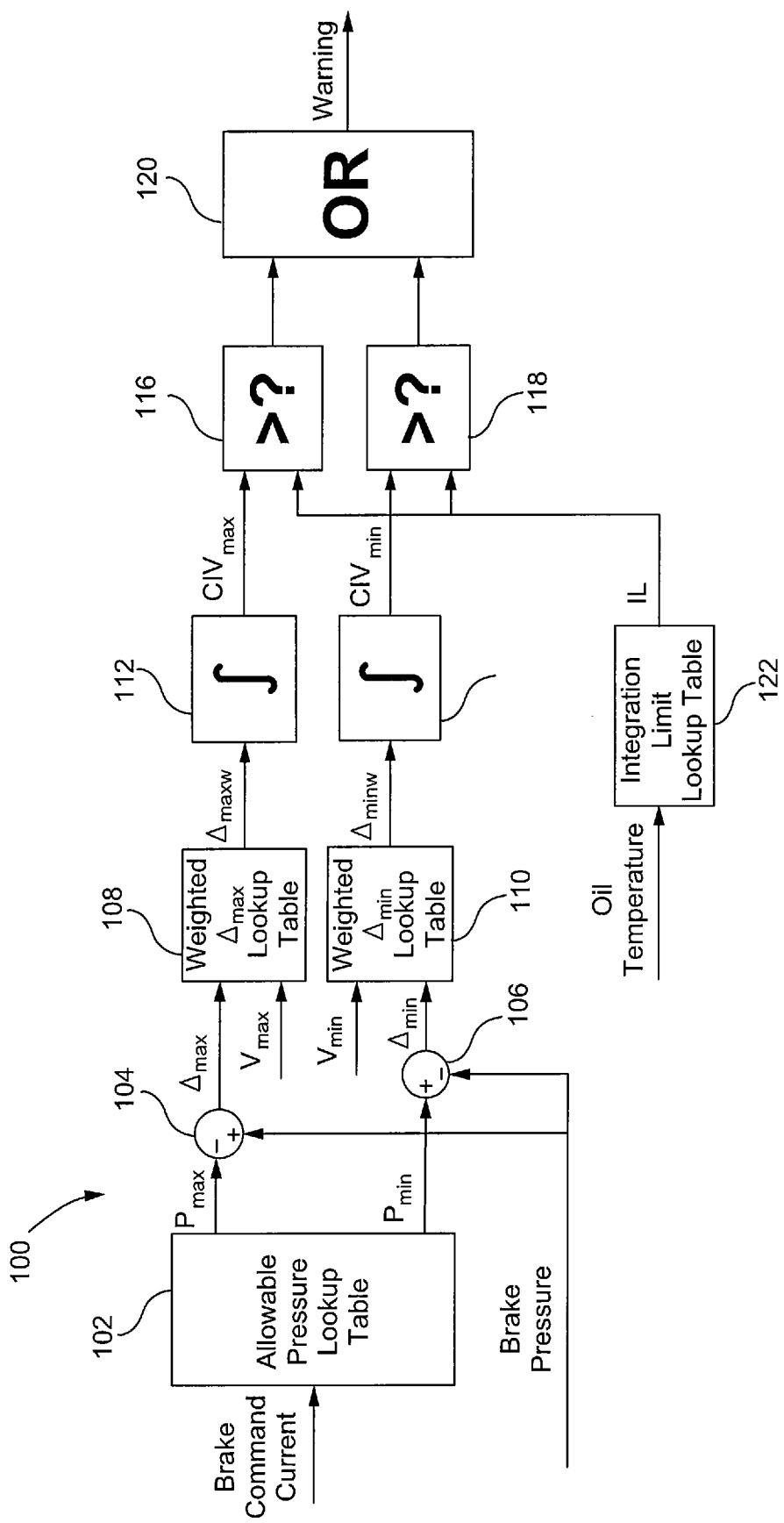
FIG. 4 is a schematic diagram of an electro-hydraulic brake valve monitoring algorithm in accordance with the present disclosure of the track-type tractor of FIG. 1.
Figure 5:
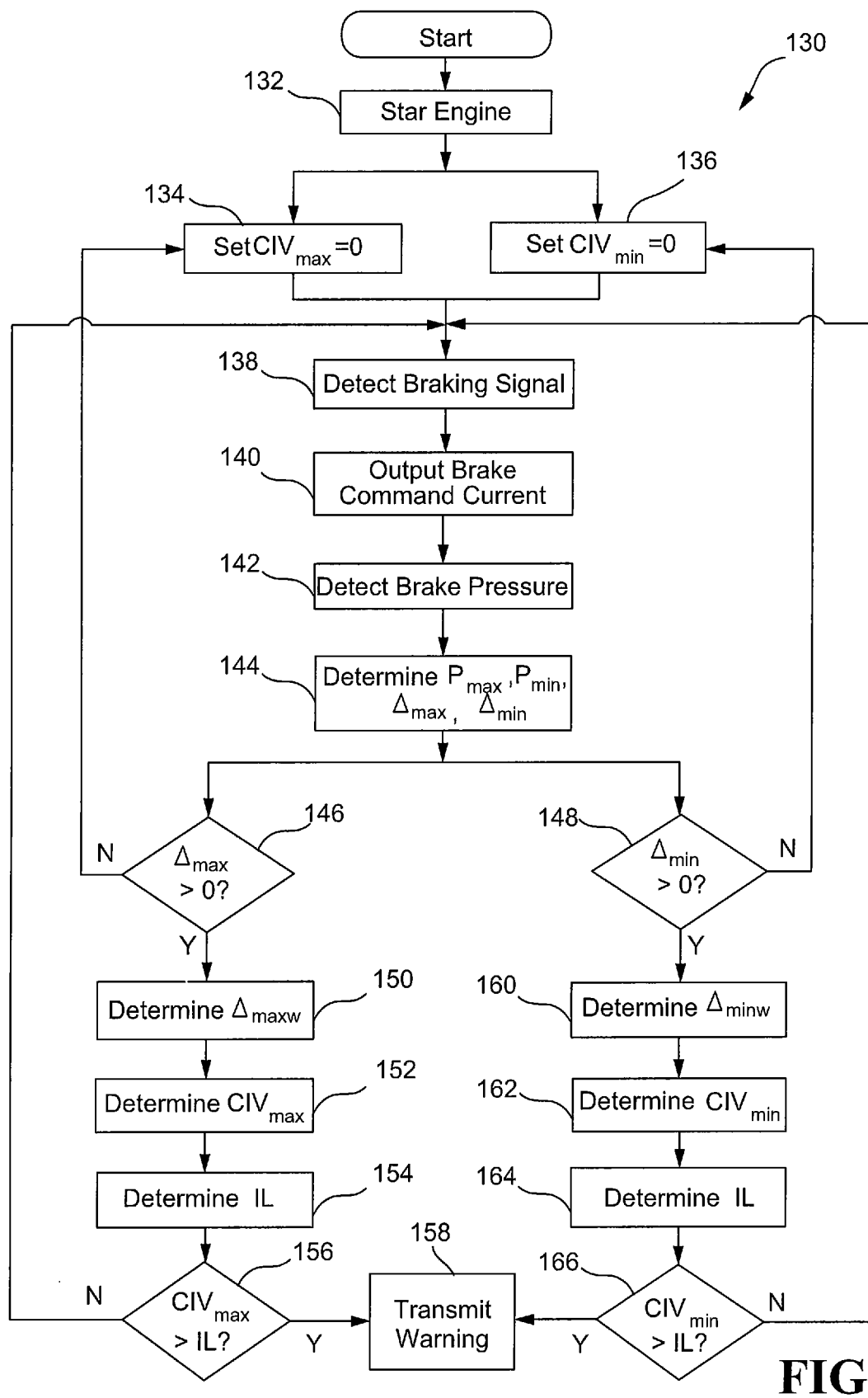
FIG. 5 is a block diagram of a an electro-hydraulic brake valve monitoring and control routine in accordance with the present disclosure implementing the electro-hydraulic brake valve monitoring algorithm of FIG. 4 in the track-type tractor of FIG. 1.

When brake pressure variations occur, the amount and duration of the variation may be evaluated to determine whether the operator should be warned and the tractor 10 should be stopped. FIG. 4 illustrates a diagram of an electro-hydraulic brake valve monitoring algorithm 100 that may determine when brake pressure variations require corrective action. The algorithm 100 may be set to execute at a relevant sampling rate that is appropriate for the tractor 10, such as a 20 ms loop that provides 50 samples per second that may allow for the appropriate response over the range of operating speeds of the tractor 10. The algorithm 100 may begin by inputting the brake current command output to the brake valve 54 by the control unit 24 to an allowable pressure lookup table 102. The allowable pressure lookup table 102 may be a table stored in the memory 42 of the control unit 24, programmed into the software executing the algorithm 100, or otherwise implemented at the tractor 10, and may be figured to provide an allowable maximum pressure $P_{max}$ and allowable minimum pressure $P_{min}$ for each value of the brake current command that may be output by the control unit 24 to the electro-hydraulic brake valve 54.

After receiving the brake current command, the allowable pressure lookup table 102 may output the corresponding allowable maximum pressure $P_{max}$ and allowable minimum pressure $P_{min}$. The allowable maximum pressure $P_{max}$ may be one input to a first adder-subtractor 104, and the allowable minimum pressure $P_{min}$ may be one input to a second adder-subtractor 106. The adder-subtractors 104, 106 may both receive, as second inputs, the actual brake output pressure $P_{act}$ calculated by the control unit 24 from the brake output pressure signals received from the brake output pressure sensor 56. The first adder-subtractor 104 may subtract the allowable maximum pressure $P_{max}$ from the actual brake output pressure $P_{act}$ to determine a maximum pressure difference $\Delta_{max}$.

The second adder-subtractor 106 may subtract the actual brake output pressure $P_{act}$ from the allowable minimum pressure $P_{min}$ to determine a minimum pressure difference $\Delta_{min}$.

Using this mathematical convention, values of the maximum pressure difference $\Delta_{max}$ and the minimum pressure difference $\Delta_{min}$ that are less than or equal to zero indicate that the actual brake output pressure $P_{act}$ is within the range of pressures expected for brake command current provided to the electro-hydraulic brake valve 54. If the value of either the maximum pressure difference $\Delta_{max}$ or the minimum pressure difference $\Delta_{min}$ is negative, then either the actual brake output pressure $P_{act}$ is outside the allowable range of pressures or the brake output pressure sensor 56 is providing an incorrect measurement of the actual brake output pressure $P_{act}$. If the maximum pressure difference $\Delta_{max}$ is less than zero, either the actual brake output pressure $P_{act}$ is too high and the brake system is over-pressurized and can cause the brakes to grab and/or blow the seals, or the brake output pressure sensor 56 is reading a higher pressure than the actual brake output pressure $P_{act}$. If the minimum pressure difference $\Delta_{min}$ is less than zero, either the actual brake output pressure $P_{act}$ is too low and the brake system is under-pressurized and the tractor 10 will not stop as quickly as expected, or the brake output pressure sensor 56 is reading a lower pressure than the actual brake output pressure $P_{act}$.

The calculated pressure differences $\Delta_{max}$, $\Delta_{min}$ may be input to a weighted maximum pressure difference lookup table 108 and a weighted minimum pressure difference lookup table 110, respectively, to determine a weighted maximum pressure difference $\Delta_{maxw}$ and a weighted minimum pressure difference $\Delta_{minw}$. Depending on the implementation, a time-rate-of-change $v_{max}$ of the maximum pressure difference $\Delta_{max}$ may be input to the weighted maximum pressure difference lookup table 108, and time-rate-of-change $v_{min}$ of the minimum pressure difference $\Delta_{min}$ may be input to the weighted minimum pressure difference lookup table 110 to determine the weighted pressure differences $\Delta_{maxw}$, $\Delta_{minw}$. The weighted pressure difference lookup tables 108, 110 may be tables stored in the memory 42 of the control unit 24, programmed into the software executing the algorithm 100, or otherwise implemented at the tractor 10.

The weighted pressure difference lookup tables 108, 110 may be configured to recognize values of the calculated pressure differences $\Delta_{max}$, $\Delta_{min}$ indicating that the actual brake output pressure $P_{act}$ is within the range of allowable pressures. As a result, where the weighted maximum pressure difference lookup table 108 receives a maximum pressure difference $\Delta_{max}$ with a value that is less than zero, the portion of the algorithm 100 evaluating the allowable maximum pressure $P_{max}$ may terminate and wait for the next brake pressure sampling cycle to again compare the actual brake output pressure $P_{act}$ to the allowable maximum pressure $P_{max}$. Similarly, the portion of the algorithm 100 proceeding through the weighted minimum pressure difference lookup table 110 may terminate when the actual brake output pressure $P_{act}$ is greater than the allowable minimum pressure $P_{min}$.

Those skilled in the art will understand that only one of the calculated pressure differences $\Delta_{max}$ or $\Delta_{min}$ may be greater than zero during a given sampling cycle when the allowable pressure lookup table 102 is properly configured so the for any value of brake command current, the allowable minimum pressure $P_{min}$ is less than the allowable maximum pressure $P_{max}$. When the actual brake output pressure $P_{act}$ lies outside the allowable range of brake pressures, the one of calculated pressure differences $\Delta_{max}$ or $\Delta_{min}$ having a value greater than zero may be used in the corresponding weighted pressure difference lookup table 108 or 110. The weighted pressure difference lookup tables 108, 110 may be configured to account for the stopping ability or inability of the tractor 10, the reduced or additional time and distance required to stop the tractor 10, and the corresponding faster response by the algorithm 100 in triggering corrective measures when the actual brake output pressure $P_{act}$ is significantly outside the range of allowable brake pressures. Consequently, the weighted pressure difference lookup tables 108, 110 may be configured to output weighted pressure differences $\Delta_{maxw}$, $\Delta_{minw}$, respectively, that are greater at higher calculated pressure differences $\Delta_{max}$, $\Delta_{min}$ than at lower pressure differences.

The time-rates-of-change $v_{max}$, $v_{min}$ of the calculated pressure differences $\Delta_{max}$, $\Delta_{min}$, respectively, may be calculated by the control unit 24 based on the pressure differences $\Delta_{max}$, $\Delta_{min}$ calculated over a plurality of sampling cycles, and may provide an indication that the amount by which the actual brake output pressure $P_{act}$ is outside the allowable range of pressures is increasing or decreasing. Where the pressure difference $\Delta_{max}$ or $\Delta_{min}$ is increasing, the corresponding weighted pressure difference lookup table 108 or 110 may be configured to produce a greater weighted pressure difference $\Delta_{maxw}$ or $\Delta_{minw}$ than when the pressure difference $\Delta_{max}$ or $\Delta_{min}$ is decreasing to be more responsive to a worsening braking problem. The weighted pressure differences $\Delta_{maxw}$, $\Delta_{minw}$ may be expressed as a number with pressure units, or may be a dimensionless scaled number having a value reflective of the magnitude of the braking problem, such as a decimal representing a percentage of a pressure variation limit value used up by the calculated pressure difference $\Delta_{max}$ or $\Delta_{min}$.

The weighted pressure differences $\Delta_{maxw}$, $\Delta_{minw}$ from the weighted pressure difference lookup tables 108, 110 may be input to corresponding first and second integrators 112, 114, respectively, that may accumulate the weighted pressure differences $\Delta_{maxw}$, $\Delta_{minw}$ over a series of readings from the brake output pressure sensor 56 and the braking device 52. The sampling rate may also be taken into account in the weighted pressure difference lookup tables 108, 110 so that warnings are triggered at the appropriate time. The weighted pressure differences $\Delta_{maxw}$, $\Delta_{minw}$, depending on which calculated pressure difference $\Delta_{max}$ or $\Delta_{min}$ is greater than zero, is added to a cumulative integration value $CIV_{max}$ or $CIV_{min}$ at the integrator 112 or 114 for subsequent comparison to an integration limit IL. The cumulative integration value $CIV_{max}$ or $CIV_{min}$ may continue to be increased as long as the actual brake output pressure $P_{act}$ is outside the range of allowable pressures. If the maximum pressure difference $\Delta_{max}$ is not greater than zero, the brake system is not over-pressurized and the maximum cumulative integration value $CIV_{max}$ for the weighted maximum pressure difference $\Delta_{maxw}$ may be reset to zero at the lookup table 108 so that the integration value can restart accumulation when over-pressurization is again detected. If the minimum pressure difference $\Delta_{min}$ is not greater than zero, the brake system is not under-pressurized and the minimum cumulative integration value $CIV_{min}$ for the weighted minimum pressure difference $\Delta_{minw}$ may be reset to zero at the lookup table 110 so that the integration value can restart accumulation when under-pressurization is again detected.

After adding the weighted pressure differences $\Delta_{maxw}$, $\Delta_{minw}$ to the cumulative integration values $CIV_{max}$, $CIV_{min}$ at the integrator 112 or 114, the cumulative integration values $CIV_{max}$, $CIV_{min}$ may be compared to an integration limit IL at a corresponding first comparator 116 or second comparator 118, respectively. The integration limit IL may be a constant value that, when met by the cumulative integration value $CIV_{max}$, $CIV_{min}$, may cause a warning to be communicated to the operator. The results of the comparisons of the cumulative integration values $CIV_{max}$, $CIV_{min}$ to the integration limit IL at the comparators 116, 118 may be output to an OR gate 120 so that the warning or other corrective response may be initiated when the actual brake output pressure $P_{act}$ is either too high or too low. Meeting the integration limit IL may also cause the brakes to be applied and the tractor 10 to be locked down until the problem is resolved.

Additional factors may be relevant to determining the integration limit IL and controlling how quickly the tractor 10 responds to over-pressurization and under-pressurization conditions. Internal and external factors can impact the responsiveness of the tractor 10. For example, the temperature of the oil in the tractor 10 may provide an indication of the viscosity of the oil and its affect on the reaction of the systems of the tractor 10 and the responsiveness of the tractor 10 to braking commands. The oil temperature may have an inverse relationship to the oil viscosity such that the systems are less responsive and more forgiving in the cold. Where these and other variables affect the ability of the tractor 10 to react to braking issues, the algorithm 100 may include an integration limit lookup table 122 for determining the integration limit IL for the current operating conditions.

In the illustrated embodiment, the oil temperature from the oil temperature sensor 58 may be transmitted to the control unit 24 (FIG. 3) and input to the integration limit lookup table 122, which may be stored in memory 42, programmed into the control software of the control unit 24, or otherwise implemented in the tractor 10. The integration limit IL may be output from the lookup table 122 and compared to the cumulative integration values $CIV_{max}$, $CIV_{min}$ at the comparators 116, 118. If the cumulative integration values $CIV_{max}$, $CIV_{min}$ exceed the integration limit IL, corrective action may be initiated. If not, the control unit 24 may continue to monitor the commanded brake pressure and the actual brake output pressure $P_{act}$ to determine whether the brake pressure issue persists. Oil temperature is one example of a factor that may be considered in determining the integration limit IL, and other conditions affecting the reaction of the tractor 10 may be factored into the configuration of the integration limit lookup table 122. Moreover, the lookup table 122 may be configured to received and evaluate information for multiple factors affecting the operation of the tractor 10. Other factors affecting the operation and responsiveness of the tractor 10 will be apparent to those skilled in the art and are contemplated by the inventors as having use in detecting and reacting to uncommanded motion in accordance with the present disclosure.

The electro-hydraulic brake valve monitoring algorithm 100 may be implemented at the control unit 24 within an electro-hydraulic brake valve monitoring and control routine 130 as shown in FIG. 3. The routine 130 may begin at a block 132 where the engine 18 is started by the control unit 24 when the operator actuates a starter of the tractor 10 within the operator station 26. After the engine 18 is started, control may pass to blocks 134, 136 where the control unit 24 may initialize the cumulative integration values $CIV_{max}$, $CIV_{min}$ stored at the memory 42 by setting the values to zero and indicating that brake over-pressurization and under-pressurization have not been detected. With the engine 18 running, the operator may make additional preparations for operating the tractor 10, such as positioning the blade 20 and ripper 22 with respect to the surface 28, and engaging a transmission (not shown) with the engine 18, and then begin to propel the tractor 10 forward or backward.

With the tractor 10 moving, control may pass to a block 138 where the control unit 24 may detect braking signals from the braking device 52. Regardless of the type of braking device 52, the control unit 24 is configured to receive the braking signals from the braking device 52 and interpret the signals to determine an amount of braking pressure to be generated by the electro-hydraulic brake valve 54. With the braking signals received from the braking device 52, control may pass to a block 140 where the control unit 24 may output brake command currents to the electro-hydraulic brake valve 54 to cause the brake valve 54 to respond and generate the specified amount of brake pressure in the braking system. The brake command currents may cause an increase in the brake pressure, cause a decrease, or maintain the brake pressure at the current level.

As the brake command currents are received at the brake valve 54 and the brake valve 54 creates brake pressure, control of the routine 130 may pass to a block 142 where the control unit 24 may detect and determine the actual brake output pressure $P_{act}$. In the embodiment of FIG. 3, the actual brake output pressure $P_{act}$ may be determined via brake output pressure signals provided by the brake output pressure sensor 56 wherein the brake output pressure signals will be indicative of the brake pressure generated by the electro-hydraulic brake valve 54.

After determining the actual brake output pressure $P_{act}$ at the block 142, control may pass to a block 144 where the control unit 24 determine the allowable maximum pressure $P_{max}$, the allowable minimum pressure $P_{min}$, the maximum pressure difference $\Delta_{max}$ and the minimum pressure difference $\Delta_{min}$. The allowable pressures $P_{max}$, $P_{min}$ may be determined by inputting the brake command currents to the allowable pressure lookup table 102, and the pressure differences $\Delta_{max}$, $\Delta_{min}$ may be determined by inputting the actual brake output pressure $P_{act}$ and the allowable pressures $P_{max}$, $P_{min}$ into the adder-subtractors 104, 106, respectively. The pressure differences $\Delta_{max}$, $\Delta_{min}$ may then be input to the weighted pressure difference lookup tables 108, 110, respectively, to determine whether either or both pressure differences $\Delta_{max}$, $\Delta_{min}$ are greater than zero at blocks 146, 148. If the control unit 24 determines that the maximum pressure difference $\Delta_{max}$ is not greater than zero at the block 146, the actual brake output pressure $P_{act}$ is less than the allowable maximum pressure $P_{max}$, and the over-pressurization portion of the routine 130 may pass back to the block 134 to reset the cumulative integration value $CIV_{max}$ equal to zero. Similarly, control of the under-pressurization portion of the routine 130 passes back to the block 136 to reinitialize the minimum cumulative integration value $CIV_{min}$ to zero if the minimum pressure difference $\Delta_{min}$ is not greater than zero at the block 148.

Referring first to the over-pressurization portion of the routine 130, if the control unit 24 determines that the maximum pressure difference $\Delta_{max}$ is greater than zero at the block 146, then over-pressurization may be occurring and control may pass to a block 150 to determine the weighted maximum pressure difference $\Delta_{maxw}$. The weighted maximum pressure difference $\Delta_{maxw}$ may be determined by the control unit 24 as discussed above by inputting the maximum pressure difference $\Delta_{max}$ and the time-rate-of-change $v_{max}$ of the maximum pressure difference $\Delta_{max}$ into the weighted maximum pressure difference lookup table 108. Control may pass to a block 152 after the weighted maximum pressure difference $\Delta_{maxw}$ is determined so that the weighted maximum pressure difference $\Delta_{maxw}$ may be added to the maximum cumulative integration value $CIV_{max}$. The weighted maximum pressure difference $\Delta_{maxw}$ may be input to the integrator 112, and the integrator 112 in turn will increase the maximum cumulative integration value $CIV_{max}$ by the weighted maximum pressure difference $\Delta_{maxw}$. The integration limit IL may then be determined at a block 154. As discussed above, the integration limit IL may be a constant value, or may be determined by the control unit 24 at the integration limit lookup table 122 based on the current values of one or more operating variables or parameters of the tractor 10, such as the current oil temperature measured by the oil temperature sensor 58. After both values are determined at blocks 152, 154, the updated maximum cumulative integration value $CIV_{max}$ may then be compared to the integration limit IL at a block 156. The updated maximum cumulative integration value $CIV_{max}$ may be input to the comparator 116 along with the integration limit IL for the tractor 10.

If the maximum cumulative integration value $CIV_{max}$ is less than the integration limit IL, the over-pressurization condition has not had sufficient magnitude and duration for the algorithm 100 as implemented in the routine 130 to trigger a response strategy by the control unit 24 to warn the operator or stop the tractor 10. In other words, the over-pressurization in the brake system is still within the acceptable limits for the current operating conditions of the tractor 10. Because the cumulative over-pressurization has not exceeded the acceptable limits, control may pass back to the block 138 to continue executing the braking signals provided by the operator via the braking device 52, comparing the actual brake output pressure $P_{act}$ to the allowable maximum pressure $P_{max}$, and increasing the value representing the cumulative over-pressurization if the actual brake output pressure $P_{act}$ is greater than the allowable maximum pressure $P_{max}$.

Alternatively, if the maximum cumulative integration value $CIV_{max}$ is greater than or equal to the integration limit IL when compared at the block 156, then control may pass to a block 158 where the control unit 24 may initiate a brake over-pressurization response strategy in recognition of the magnitude and duration of the over-pressurization exceeding the acceptable limits. In one implementation, the response strategy may include providing sensory perceptible warnings or alarms for the operator while allowing the tractor 10 to continue operating with the over-pressurization condition. The warnings may include causing the control unit 24 to illuminate a warning lamp (not shown) in the operator station 26, to output an auditory alarm message or siren from a speaker (not shown), to output a visual alarm message at a display device (not shown) in the operator station 26, or otherwise notify the operator. In other implementations, such as where the tractor 10 is operating autonomously and no on-board operator is present, a secondary braking mechanism (not shown) may be engaged by the control unit 24 to stop the tractor 10 and lock down the tractor 10 until maintenance can be performed. Other response strategies will be apparent to those skilled in the art. Where operation of the tractor 10 continues, control may pass back to the block 138 from the block 158 to continue monitoring the actual brake output pressure $P_{act}$. If the over-pressurization continues, the alarms and warnings may continue. If the actual brake output pressure $P_{act}$ decreases below the allowable maximum pressure $P_{max}$, the control unit 24 may stop the outputting of the alarm and warning messages when the maximum cumulative integration value $CIV_{max}$ is reset to zero.

The brake under-pressurization portion of the routine 130 may execute in a similar manner as the over-pressurization portion via blocks 160-166 if the control unit 24 determines that the minimum pressure difference $\Delta_{min}$ is greater than zero at the block 146. Control may pass to the block 160 to determine the weighted minimum pressure difference $\Delta_{minw}$ at the weighted minimum pressure difference lookup table 110. The weighted minimum pressure difference $\Delta_{minw}$ may then be added to the minimum cumulative integration value $CIV_{min}$ by the integrator 114 at the block 162, and the integration limit IL may be determined at the block 164. After both values are determined at blocks 162, 164, the updated minimum cumulative integration value $CIV_{min}$ may then be compared to the integration limit IL by the comparator 118 at a block 166. If the minimum cumulative integration value $CIV_{min}$ is less than the integration limit IL, control may pass back to the block 138. If the minimum cumulative integration value $CIV_{min}$ is greater than or equal to the integration limit IL when compared at the block 166, then control may pass to the block 158 to execute the appropriate response strategy.

Industrial Applicability

The electro-hydraulic brake valve monitoring algorithm 100 as implemented in the electro-hydraulic brake valve monitoring and control routine 130 addresses issues existing in previous systems relating to the sensitivity of prior systems to triggering at low pressures and high pressures, and to responding to variable conditions affecting a vehicle's responsiveness to operator commands and ability to react to over-pressure and under-pressure conditions in a braking system. The algorithm 100 replaces prior systems that may have responded solely based on actual brake pressures being greater than or less than the desired brake pressure, and possibly for a specified duration. The algorithm 100 provides a weighting of the magnitude of the pressure difference and, in some implementations, the time-rate-of-change of the pressure difference. The vehicle may react sooner to the pressure difference at greater pressure differences wherein the operator has less time and distance to react than at lower pressure differences. Previously, the vehicles reacted after the same prescribed time period regardless of the magnitude of the pressure difference or the rate at which the pressure difference was changing.

With the algorithm 100 in accordance with the present disclosure, the weighted brake pressure differences provided to the integrators 112, 114 are greater when the pressure difference and rate of change of the pressure difference indicate that the detected over-pressure or under-pressure problem is more severe so that the cumulative integration value increases at a faster rate. The cumulative integration value approaches the integration limit sooner so that a response to the braking condition is triggered earlier to notify the operator, and to allow the vehicle and operator to react before an accident occurs. Conversely, the algorithm 100 will trigger a response slower when the over-pressure or under-pressure problem is less severe. The weighted brake pressure difference will generally be lower when the pressure difference is lower than at higher pressure differences. As a result, the braking condition response will be triggered later at lower pressure differences where the speed of reacting to the situation is less critical.

The algorithm 100 also adjusts the integration limit and, correspondingly, the speed with which the vehicle reacts to over-pressure and under-pressure conditions, based on the vehicle's responsiveness to operator commands and ability to respond to the braking issues. Vehicles react differently based on internal factors and external conditions affecting the performance of the vehicles. At times, a vehicle may respond more quickly or more slowly than the nominal performance for which the vehicle is designed. For example, the oil temperature affects the oil's viscosity, which affects the vehicles reaction to commands issued by the operator and control unit 24, such as to turn the tractor 10 and to change the brake pressure. The oil may be more viscous at startup or in low temperature operating environments, and the corresponding vehicle systems using the oil may be less responsive. The lookup table 122 may be configured to account for the vehicle's ability to react and provide increased integration limits when the oil temperature sensor 58 indicates that the oil has a relatively low temperature.

At higher temperatures, such as after the engine 18 is running and transferring heat to the oil, or the vehicle is operating in a high temperature environment, the oil's viscosity may be reduced and the reactions of the systems of the vehicle speed up. This relationship between the oil temperature and the performance of the vehicle may be factored into the integration limit lookup table 122 so that the integration limit decreases as the oil temperature rises. Other internal and external factors may also influence the performance of the vehicle and may be taken into account in the integration limit lookup table 122. Such factors will be apparent to those skilled in the art, and the use of such factors in the detection and response to over-pressure and under-pressure conditions in vehicles is contemplated by the inventor as having use in algorithms 100 and routines 130 in accordance with the present disclosure.

It will be apparent to those skilled in the art that various modifications and variations can be made in the disclosed system and method without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A brake valve monitoring system for a machine, the brake valve monitoring system comprising:
    a brake valve for creating brake pressure in a braking system of the machine;
    a braking device for providing braking signals indicating a desired brake pressure to be applied by the braking system of the machine; and
    a control unit that monitors changes in braking performance, the control unit operatively connected to the brake valve and the braking device,
    the control unit configured to receive the braking signals from the braking device and to output brake command current to cause the brake valve to create a commanded brake pressure in the braking system,
    the control unit configured to determine an actual brake output pressure in the braking system,
    the control unit configured to determine an acceptable brake pressure range based on the brake command current,
    the control unit configured to determine whether the actual brake output pressure is within the acceptable brake pressure range,
    the control unit configured to determine a weighted brake pressure difference in response to determining that the actual brake output pressure is not within the acceptable brake pressure range, wherein the weighted brake pressure difference is determined based on a difference between the actual brake output pressure and a corresponding end of the acceptable brake pressure range,
    the control unit configured to add the weighted brake pressure difference to a cumulative integration value for a brake pressure difference,
    the control unit configured to compare the cumulative integration value to an integration limit for the brake pressure difference, and
    the control unit configured to execute a response strategy in response to determining that the cumulative integration value is greater than the integration limit.

2. The brake valve monitoring system of claim 1, wherein the brake valve monitoring system comprises a brake pressure sensor operatively connected to the braking system to sense the actual brake output pressure of the braking system, and operatively connected to the control unit to transmit a brake pressure signal to the control unit, and wherein the control unit is configured to receive the brake pressure signal and to determine the actual brake output pressure based on the brake pressure signal.

3. The brake valve monitoring system of claim 1, wherein the control unit being configured to determine whether the actual brake output pressure is within the acceptable brake pressure range comprises:
    the control unit configured to determine an allowable maximum pressure and an allowable minimum pressure based on the brake command current;
    the control unit configured to determine a maximum pressure difference by subtracting the allowable maximum pressure from the actual brake output pressure and determine a minimum pressure difference by subtracting the actual brake output pressure from the allowable minimum pressure; and
    the control unit configured to determine that the actual brake output pressure is outside the acceptable brake pressure range if either the maximum pressure difference or the minimum pressure difference is greater than zero.

4. The brake valve monitoring system of claim 1, wherein the control unit is configured to determine the weighted brake pressure difference by inputting the difference between the actual brake output pressure and the corresponding end of the acceptable brake pressure range to a weighted brake pressure difference lookup table, and outputting the weighted brake pressure difference from the weighted brake pressure difference lookup table.

5. The brake valve monitoring system of claim 4, wherein the control unit is configured to determine the weighted brake pressure difference by inputting a time-rate-of-change of the difference between the actual brake output pressure and the corresponding end of the acceptable brake pressure range to the weighted brake pressure difference lookup table.

6. The brake valve monitoring system of claim 1, wherein the control unit is configured to set the cumulative integration value equal to zero in response to determining that the actual brake output pressure is within the acceptable brake pressure range.

7. The brake valve monitoring system of claim 1, wherein the control unit is configured to repeat the steps for determining whether the actual brake output pressure is not within the acceptable brake pressure range in response to determining that the cumulative integration value is less than the integration limit.

8. The brake valve monitoring system of claim 1, wherein the control unit being configured to execute the response strategy comprises the control unit configured to at least one of output a sensory perceptible warning to an operator of the machine and engage a secondary braking mechanism of the machine in response to determining that the cumulative integration value is greater than the integration limit.

9. A method for monitoring a brake valve in a machine having a control unit operatively connected to the brake valve, the method comprising:
    commanding, via the control unit, the brake valve to apply a desired brake pressure in a braking system of the machine;
    determining, via the control unit, an actual brake output pressure in the braking system of the machine;

determining, via the control unit, an acceptable brake pressure range based on the commanded desired brake pressure;

determining, via the control unit, whether the actual brake output pressure is within the acceptable brake pressure range;

determining, via the control unit, a weighted brake pressure difference in response to determining that the actual brake output pressure is not within the acceptable brake pressure range, wherein the weighted brake pressure difference is determined based on a difference between the actual brake output pressure and a corresponding end of the acceptable brake pressure range;

adding, via the control unit, the weighted brake pressure difference to a cumulative integration value for a brake pressure difference;

comparing, via the control unit, the cumulative integration value to an integration limit for the brake pressure difference; and executing, via the control unit, a response strategy in response to determining that the cumulative integration value is greater than the integration limit.

10. The method of claim 9, wherein commanding the brake valve comprises:

receiving a braking signal from a braking device of the machine at a control unit of the machine;

outputting a brake command current from the control unit to the brake valve to cause the brake valve to apply the desired brake pressure, wherein the brake command current corresponds to the braking signal.

11. The method of claim 10, wherein determining whether the actual brake output pressure is within the acceptable brake pressure range comprises comparing the actual brake output pressure to a allowable maximum pressure and a allowable minimum pressure commanded by the brake command current.

12. The method of claim 9, wherein determining the weighted brake pressure difference comprises:

inputting the difference between the actual brake output pressure and the corresponding end of the acceptable brake pressure range to a weighted brake pressure difference lookup table; and outputting the weighted brake pressure difference from the weighted brake pressure difference lookup table.

13. The method of claim 12, wherein determining the weighted brake pressure difference comprises inputting a time-rate-of-change of the difference between the actual brake output pressure and the corresponding end of the acceptable brake pressure range to the weighted brake pressure difference lookup table.

14. The method of claim 9, comprising setting the cumulative integration value equal to zero in response to determining that the actual brake output pressure is within the acceptable brake pressure range.

15. The method of claim 9, comprising repeating the steps of the method in response to determining that the cumulative integration value is less than the integration limit.

16. A brake valve monitoring system for a machine, the brake valve monitoring system comprising:

a brake valve for creating brake pressure in a braking system of the machine;

a braking device for providing braking signals indicating a desired brake pressure to be applied by the braking system of the machine; and a control unit operatively connected to the brake valve and the braking device, the control unit configured to receive the braking signals from the braking device and to output brake command current to cause the brake valve to create a commanded brake pressure in the braking system, the control unit configured to determine an actual brake output pressure in the braking system, the control unit configured to determine an acceptable brake pressure range based on the brake command current, the control unit configured to determine whether the actual brake output pressure is within the acceptable brake pressure range, the control unit configured to determine a cumulative integration value for a brake pressure difference in response to determining that the actual brake output pressure is not within the acceptable brake pressure range, wherein the cumulative integration value is determined based on a brake pressure difference between the actual brake output pressure and a corresponding end of the acceptable brake pressure range, the control unit configured to determine an integration limit for the brake pressure difference based on a value of a parameter indicative of an ability of the machine to produce the desired brake pressure, the control unit configured to compare the cumulative integration value to the integration limit for the brake pressure difference, and the control unit configured to execute a response strategy in response to determining that the cumulative integration value is greater than the integration limit.

17. The brake valve monitoring system of claim 16, comprising a parameter sensor for determining the value of the parameter operatively connected to the control unit, wherein the control unit is configured to receive the value of the parameter from the parameter sensor, to input the value of the parameter to an integration limit lookup table, and to output the integration limit from the integration limit lookup table.

18. The brake valve monitoring system of claim 17, wherein the parameter is an oil temperature and the parameter sensor is an oil temperature sensor.

19. The brake valve monitoring system of claim 18, wherein the integration limit decreases as the value of the oil temperature increases.

20. The brake valve monitoring system of claim 16, wherein the control unit being configured to execute the response strategy comprises the control unit configured to at least one of output a sensory perceptible warning to an operator station of the machine and engage a secondary braking mechanism of the machine in response to determining that the cumulative integration value is greater than the integration limit.

21. A method for monitoring a brake valve in a machine having a control unit operatively connected to the brake valve, the method comprising:

commanding, via the control unit, the brake valve to apply a desired brake pressure in a braking system of the machine;

determining, via the control unit, an actual brake output pressure in the braking system of the machine;

determining, via the control unit, an acceptable brake pressure range based on the commanded desired brake pressure;

determining, via the control unit, whether the actual brake output pressure is within the acceptable brake pressure range;

determining, via the control unit, a cumulative integration value for a brake pressure difference in response to determining that the actual brake output pressure is not within the acceptable brake pressure range, wherein the cumulative integration value is determined based on a brake pressure difference between the actual brake output pressure and a corresponding end of the acceptable brake pressure range;

determining, via the control unit, an integration limit for the brake pressure difference, wherein the integration limit is based on a value of a parameter indicative of an ability of the machine to produce the desired brake pressure;

comparing, via the control unit, the cumulative integration value to the integration limit; and executing, via the control unit, a response strategy in response to determining that the cumulative integration value is greater than the integration limit.

22. The method of claim 21, wherein determining the integration limit comprises:

inputting the value of the parameter to an integration limit lookup table; and outputting the integration limit from the integration limit lookup table.

23. The method of claim 21, wherein the parameter is an oil temperature.

24. The method of claim 23, wherein the integration limit decreases as the value of the oil temperature increases.

* * * * *